(12) United States Patent
Watzenberger et al.

(10) Patent No.: US 6,524,545 B1
(45) Date of Patent: Feb. 25, 2003

(54) METHOD FOR PRODUCING AQUEOUS HYDROXYLAMINE SOLUTIONS WHICH ARE SUBSTANTIALLY FREE OF METAL IONS

(75) Inventors: Otto Watzenberger, Mannheim (DE); Hans-Michael Schneider, Worms (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/622,170

(22) PCT Filed: Feb. 16, 1999

(86) PCT No.: PCT/EP99/00993

§ 371 (c)(1),
(2), (4) Date: Aug. 14, 2000

(87) PCT Pub. No.: WO99/42434

PCT Pub. Date: Aug. 26, 1999

(30) Foreign Application Priority Data

Feb. 17, 1998 (DE) .......................................... 198 06 578

(51) Int. Cl.[7] .............................................. C01B 21/20
(52) U.S. Cl. ..................................................... 423/387
(58) Field of Search ................................ 423/265, 387, 423/388

(56) References Cited

U.S. PATENT DOCUMENTS

| 3,720,758 A | * | 3/1973 | De Rooij et al. | ............ | 423/388 |
| 5,266,290 A | * | 11/1993 | Levinthal et al. | ............ | 423/387 |
| 5,472,679 A | | 12/1995 | Levinthal et al. | ............ | 423/387 |
| 5,788,946 A | | 8/1998 | Riddle et al. | ............... | 423/387 |
| 5,872,295 A | * | 2/1999 | Michelotti et al. | ........... | 564/301 |

FOREIGN PATENT DOCUMENTS

| DE | 36 08 495 | | 9/1987 | | |
| GB | 1427689 A | * | 3/1976 | ........... | B01D/13/02 |
| JP | 49 014640 | | 2/1974 | | |
| WO | WO 97/22551 | | 6/1997 | | |

OTHER PUBLICATIONS

McNulty "The Many Faces of Ion Exchange Resins" Chem. Eng. (1997) pp. 94–100.

* cited by examiner

*Primary Examiner*—Stanley S. Silverman
*Assistant Examiner*—Edward M. Johnson
(74) *Attorney, Agent, or Firm*—Keil & Weinkauf

(57) ABSTRACT

The present invention relates to a process for the preparation of an aqueous hydroxylamine solution which is essentially free of metal ions, wherein the hydroxylamine solution is subjected to at least one treatment with an acidic cation exchanger.

6 Claims, No Drawings

METHOD FOR PRODUCING AQUEOUS HYDROXYLAMINE SOLUTIONS WHICH ARE SUBSTANTIALLY FREE OF METAL IONS

The present invention relates to a process for the preparation of aqueous hydroxylamine solutions which are essentially free of metal ions.

Highly pure, concentrated, aqueous hydroxylamine solutions are used, inter alia, in the electronics industry, for example together with other substances for the preliminary cleaning of the boards. For use in the electronics industry, an impurity content of well below 1 ppm, in general even in the ppb range, is usually required (i.e. electronic grade product). However, the hydroxyl-amine solutions now commercially available contain impurities in the ppm range, for example sodium sulfate or other metal compounds, resulting from the preparation of said solutions.

One possibility for purification is working up by distillation, as described in U.S. Pat. No. 5,472,679. However, it must be ensured that the temperature of 65° C. is not exceeded during the distillation since the onset temperature, i.e. the temperature at which detectable decomposition begins, is about 70° C. for 50% strength by weight hydroxylamine solution. To permit the isolation of hydroxylamine as a top product, distillation is usually carried out on a small scale and in vacuo at very low temperatures. Such a distillation is very expensive and time-consuming.

The working up by distillation, described in WO 97/22551, avoids the disadvantages of the process described in the stated U.S. patent. Nevertheless, it is true that the process of WO 97/22551, too, is relatively expensive. Accordingly, salt-free aqueous electronic grade hydroxylamine solutions are correspondingly expensive, so that their use is limited by economics to a few applications.

It is an object of the present invention to provide a process for the preparation of hydroxylamine solutions which are essentially free of metal ions, in particular sodium ions, the process being simple and economical to carry out.

The use of cation exchangers for separating metal ions from aqueous solutions is known. Typical applications are in the area of water purification, metal ions generally being separated off unselectively. The object is usually the preparation of a solution essentially free of metal ions. Cation exchangers capable of separating polyvalent metal ions which readily form complexes, for example $Fe^{3+}$ or $Ni^{2+}$, selectively from aqueous solutions are also known. This is based on the fact that these metal ions form complexes with the ion exchanger which has chelate-forming groups as is reported, for example, in The Many Faces of Ion-Exchange Resins, Chemical Engineering, June 1997, 94–100. There, the table on page 98 indicates that the affinity of $Fe^{3+}$ ions to the ion exchanger described is 350,000 times higher than that of the comparative substance $Ca^{2+}$, and that of the Ni ions is 3200 times higher. In the presence of about 50 g/l of ammonium ions (corresponding to 200 g/l of ammonium sulfate), the affinity values decrease sharply, the affinity of nickel ions to, for example, 30. Alkali metal cations are not included in this table. They have a much lower affinity than even the calcium ions used in the table for comparison.

In addition to the metal present as an impurity, aqueous hydroxylamine solutions also contain the hydroxylammonium cation formed by acceptance of a proton. In a 50% strength by weight hydroxylamine solution, 15.14 mol of hydroxylamine/l are present in addition to from 1 to 10 ppm of metal ions (corresponding to from 0.4 to $1.7 \times 10^{-5}$ mol/l, based on Na+ ions). There is a deficiency of cations to be separated off relative to the hydroxyl-ammonium cations. Under these conditions, a person skilled in the art expects that a further decrease in the concentration of the metal ions contained in these small amounts, and in particular alkali metal ions, is no longer possible by treatment with an ion exchanger.

We have found, surprisingly, that this object is achieved and that the metal ions can be separated off selectively by treating the hydroxylamine solutions with an acidic cation exchanger.

The present invention therefore relates to a process for the preparation of an aqueous hydroxylamine solution, in particular a highly pure one, which is essentially free of metal ions, wherein the hydroxylamine solution is subjected to at least one treatment with an acidic cation exchanger.

A weakly acidic cation exchanger, i.e. a cation exchanger having a pH in the acid form of from 2 to 6, in particular from 3 to 6, is preferably used for this purpose. Furthermore, a cation exchanger which has chelate-forming groups, such as iminodiacetic acid groups, is preferably used.

Suitable cation exchangers are, for example, the Lewatit TP types from Bayer, such as Lewatit TP 207, the Amberlite IRC types, Duolite C 433, etc., Dowex CCR or MWC and the like. The cation exchangers are used in the acid form. If required, they are for this purpose treated with an acid, for example sulfuric acid, in order to remove the cation. They are then usually washed acid-free with high-purity water.

The treatment of the hydroxylamine solution can also be effected using a strongly acidic cation exchanger in the acid form, i.e. a cation exchanger in the acid form having a pH of from 0 to 2, in particular from 0 to 1. Usable strongly acidic cation exchangers are, for example, the resins Amberlite IR-120, IR-122 and IRC-50 and Amberjet 1500H from Rohm & Haas, Dowex 88 from Dow Chemical, Duolite C-200, C-26, C-280 from Rohm and Haas and Purolite C-100, C-105 and C-150. The acid form can be produced using conventional strong acids, such as hydrochloric acid.

The treatment of the hydroxylamine solution with the cation exchanger is carried out in the usual manner, for example by treatment in a reaction vessel with stirring. Preferably, however, the hydroxylamine solution is poured over a bed of cation exchanger, for example a column loaded with the cation exchanger.

On the cation exchanger, hydroxylamine undergoes slight decomposition, inter alia into $N_2$ and $NH_3$. The gas bubbles formed can impair the uniformity of the liquid stream and lead to undesired axial back-mixing. It is therefore particularly preferred to pass the hydroxylamine solution opposite to the direction of gravitational force over a bed comprising the cation exchanger. Thus, the treatment of the hydroxylamine solution can be expediently carried out in a column loaded with the cation exchanger and fed from below. Preferably, the feed is effected at a high flow rate, preferably a flow rate $\geq 10$ m/h, in particular $\geq 15$ m/h (the flow rate is the volume of hydroxylamine solution throughput per hour, based on the cross section of the empty column). Expediently, a retaining element, for example a perforated plate or a knitted fabric, which prevents the discharge of the cation exchanger, is present at the upper end of the column. As a result of these measures, gas bubbles formed are continuously discharged from the column and the ion exchanger is present as a cohesive bed. Undesired back-mixing of the solution to be purified is thus avoided.

The temperature at which the treatment is carried out is not critical. However, because of the decomposability of the hydroxylamine, higher temperatures are avoided. In general, a temperature of from 0 to about 50° C., preferably 20–30° C., is employed.

The ratio of hydroxylamine solution to be purified to cation exchanger depends on the amount of cations to be removed. A person skilled in the art can determine the suitable amount in a simple manner by monitoring the purification effect.

The novel process can be carried out continuously or batchwise. The continuous procedure is preferred.

The novel process makes it possible to purify hydroxylamine solutions which contain up to about 50 ppm, in particular up to 30 ppm, in general from 1 to 10 ppm, of metal ions. The metal ions are in general alkali metal ions, in particular sodium ions.

The hydroxylamine solutions obtained by the novel process are essentially free of metal ions, i.e. they contain less than 1 ppm, in particular less than 0.5 ppm, of metal ions. Repeating the treatment with a cation exchanger one or more times makes it possible further to reduce the metal ion content, for example to <0.1 ppm. Said solutions are therefore suitable for use in the electronics industry.

The novel treatment of the hydroxylamine solution with an acidic cation exchanger can be combined with an anion exchanger treatment. The aqueous hydroxylamine solutions to be treated according to the invention contain, as a rule, a stabilizer which prevents or retards decomposition of the hydroxylamines. The stabilizers are generally anionic complexing agents which are capable of complexing and deactivating heavy metal ions which, in uncomplexed form, are potent catalysts of the hydroxylamine decomposition. In the treatment of stabilized hydroxylamine solutions with an anion exchanger, the stabilizer is bound to the anion exchanger. There is therefore the danger that the hydroxylamine solution treated with an anion exchanger is no longer sufficiently stable. Although stabilizer can again be added to the hydroxylamine solution after the treatment with an anion exchanger, the conventional stabilizers contain, as a result of their preparation, a larger or smaller amount of alkali metal ions, in particular sodium ions, so that the success of the purification by a preceding cation exchanger treatment is substantially canceled out by the subsequent addition of stabilizer. As a rule, it is therefore preferable if the novel process does not include any treatment of the hydroxylamine solution with an anion exchanger, in particular a strongly basic anion exchanger.

It has proven particularly preferable to subject the hydroxylamine solution, after the treatment with the acidic cation exchanger, to a treatment with an anion exchanger and in particular a strongly basic anion exchanger in the hydroxyl form, in order to remove undesired anions.

For removing undesired anions in a hydroxylamine solution to be treated, it is also possible to use a process in which the hydroxylamine solution is subjected to at least one treatment with an anion exchanger in hydroxyl form, a stabilizer, preferably an anion complexing agent, is added to the treated hydroxylamine solution, and the hydroxylamine solution is then subjected to at least one treatment with an acidic cation exchanger. An alternative, preferred process is one in which the hydroxylamine solution is subjected to at least one treatment with an anion exchanger in hydroxyl form, the hydroxylamine solution is then subjected to at least one treatment with an acidic cation exchanger, and an aqueous solution of a stabilizer, in particular of an anionic complexing agent, which was subjected beforehand to a treatment with an acidic cation exchanger to remove metal ions, in particular alkali metal ions, is added to the hydroxylamine solution.

Usable basic anion exchangers are, for example, the resins Amberlite IRA-400, IRA-402, IRA-904, IRA-92, IRA-93 and Duolite A-109 from Rohm & Haas, Dowex 66 and Dowex II from Dow Chemical and Purolite A-600, A-400, A-300, A-850 and A-87 and Lewatit types from Bayer AG. The base form of the anion exchanger can be produced using conventional bases, such as sodium hydroxide or potassium hydroxide. The treatment with the anion exchanger is effected analogously to the treatment with the cation exchanger.

The examples which follow illustrate the invention without restricting it.

EXAMPLE 1

The Na form of the weakly acidic, macroporous ion exchanger Lewatit TP 207 (from Bayer) which contains iminodiacetic acid groups and has a very low selectivity with respect to Na was washed Na-free with 0.5 molar sulfuric acid at 5 (ml/h)/ml of ion exchanger resin. Said ion exchanger was then washed sulfuric acid-free with demineralized water until a pH of 6.5 was reached.

140 g/h of 50% strength by weight of hydroxylamine solution containing 10 ppm of Na ions were passed at room temperature over a 19.5 ml bed of said ion exchanger. The ratio of hydroxylamine solution feed to ion exchanger volume was 7 (ml/h)/ml. After specified times, fractions of the purified solutions were collected and the residual Na content was determined. The resulting fractions of purified solution had the following Na contents:

|  | Amount in g | Na content in mg/l |
| --- | --- | --- |
| Fraction 1 | 29.3 | not determined |
| Fraction 2 | 29.6 | 2 |
| Fraction 3 | 32.7 | 0.2 |
| Fraction 4 | 33.9 | 0.2 |

3.4 g of hydroxylamine solution were thus purified per ml of ion exchanger.

EXAMPLE 2

The hydroxylamine solution obtained according to Example 1 had a sulfate content of 30 ppm (30mg/l). To reduce the sulfate content, the solution was passed over an anion exchange column containing about 40 ml of anion exchanger in the hydroxyl form (7 ml/h hydroxylamine solution per ml of anion exchanger).

The following ion exchangers were used:

Amberlite IRA-92

Lewatit M 511

Amberlite IRA-900

In all cases, the sulfate content was reduced to 10 ppm (limit of detection).

We claim:

1. A process for the preparation of a stabilized aqueous hydroxylamine solution wherein said hydroxylamine solution is essentially free of metal ions, comprising:

a) treating an aqueous hydroxylamine solution containing metal ion impurities with an anion exchanger wherein said hydroxyl said anion exchanger is in hydroxyl form, b) subsequently treating the hydroxylamine solution obtained in step a) with an acidic cation exchanger, and c) subsequently adding to the treated hydroxylamine solution obtained in step b), an aqueous solution of a stabilizer, wherein said stabilizer was treated before being added with a cation exchanger to remove metal ions.

2. A process as in claim 1, wherein the acidic cation exchanger used in step b) is a weakly acidic cation exchanger.

3. A process as claimed in claim 1, wherein the acidic cation exchanger is a cation exchanger having chelate-forming groups.

4. A process as claimed in claim 1, wherein the hydroxylamine solution is passed over a bed of the cation exchanger.

5. A process as claimed in claim 4, wherein the hydroxylamine solution is passed opposite to the direction of gravitational force over the bed of the cation exchanger.

6. A process as claimed in claim 4, wherein the hydroxylamine solution is passed in a direction opposite to the direction of gravitational force over the bed of the cation exchanger.

* * * * *

UNITED STATES PATENT AND TRADEMARK OFFICE
CERTIFICATE OF CORRECTION

PATENT NO.     : 6,524,545 B1
DATED          : February 25, 2003
INVENTOR(S)    : Watzenberger et al.

It is certified that error appears in the above-identified patent and that said Letters Patent is hereby corrected as shown below:

<u>Column 5,</u>
Line 10, "cation exchanger is a cation exchanger" should be
-- cation exchanger used in step b) is a cation exchanger --.

Signed and Sealed this

Seventeenth Day of June, 2003

JAMES E. ROGAN
*Director of the United States Patent and Trademark Office*